United States Patent [19]

Booth

[11] 4,128,137

[45] Dec. 5, 1978

[54] PERIPATETIC VEHICLES

[75] Inventor: Eric Booth, Didcot, England

[73] Assignee: National Research Development Corporation, London, England

[21] Appl. No.: 768,718

[22] Filed: Feb. 15, 1977

[30] Foreign Application Priority Data

Feb. 24, 1976 [GB] United Kingdom ............... 07239/76

[51] Int. Cl.² ............................................. B60G 25/00
[52] U.S. Cl. .............................. 180/6.5; 180/DIG. 3; 280/242 WC
[58] Field of Search ............... 180/6.5, DIG. 3, 24.06, 180/24.07, 24.08, 21, 22, 6.48, 6.2, 6.24, 6.26, 6.28, 23, 24, 24.03; 280/242 WC, 81 R, 677; 297/DIG. 4

[56] References Cited

U.S. PATENT DOCUMENTS

| 2,433,268 | 12/1947 | Fellabaum | 280/81 R |
|---|---|---|---|
| 2,586,273 | 2/1952 | Steven | 180/6.5 |
| 3,111,181 | 11/1963 | Yatich | 180/6.5 |
| 3,613,813 | 10/1971 | Biddle | 180/6.5 |
| 3,827,718 | 8/1974 | Curry | 280/242 WC |

FOREIGN PATENT DOCUMENTS 1218741 1/1971 United Kingdom ..................... 180/6.5

Primary Examiner—Joseph F. Peters, Jr.
Assistant Examiner—R. Schrecengost
Attorney, Agent, or Firm—Finnegan, Henderson, Farabow & Garrett

[57] ABSTRACT

A peripatetic vehicle, the suspension of which includes a bogie carrying two main wheels, one to either side of the vehicle, and caster wheels. The stability of the suspension is completed by further casters, supported from the body of the vehicle. The use of the bogie improves the ride of the vehicle over rough ground, and the use of only two main wheels, the rest being casters, gives high maneuverability. The main wheels may be driven, e.g. by separate motors, and the vehicle steered by driving these wheels differentially. Stable steering is improved by locating the transverse axis of the main wheels closely beneath the center of mass of the loaded vehicle.

11 Claims, 7 Drawing Figures

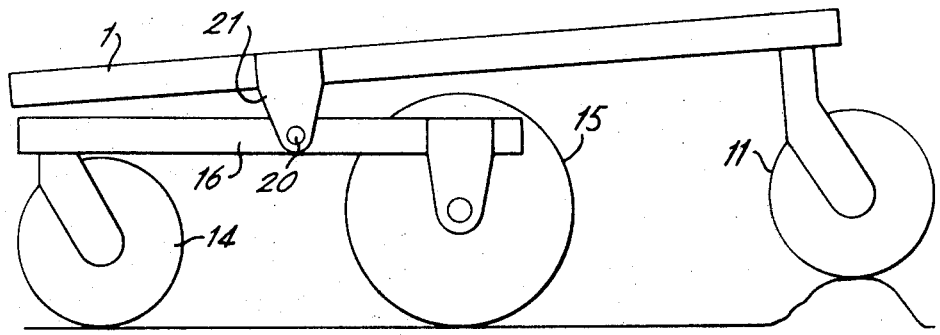
Fig. 4
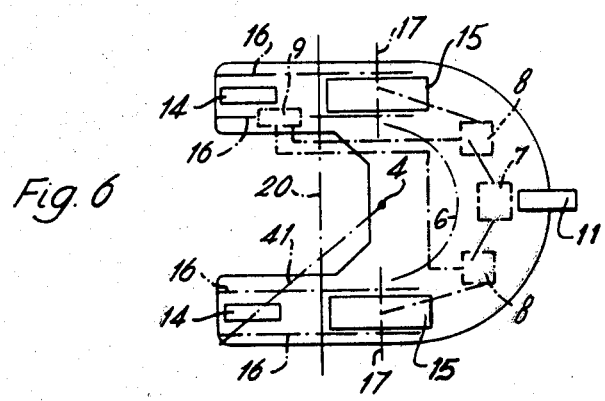
Fig. 6
Fig. 5
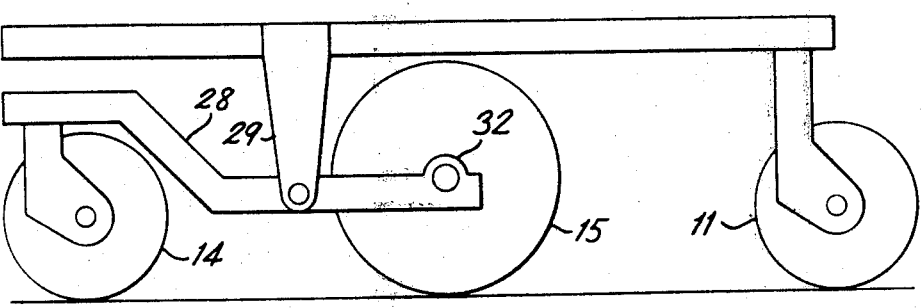

PERIPATETIC VEHICLES

This invention relates to peripatetic vehicles, that is to say vehicles that make contact with the ground through wheels and are not confined to rails or the like but are steerable and able to proceed on various headings over roads, paths, floors and other such surfaces. While the invention applies also to unpowered vehicles that an assistant must both push (or pull) and steer, it applies particularly to self-propelled invalid chairs or other vehicles, steered by the occupant or by a walking assistant.

An important requirement of such chairs is that they should be able to turn very tightly, preferably about a vertical axis passing practically through the middle of the vehicle. A vehicle with all wheels mounted to caster has this capacity, but is unsuitable as a self-propelled invalid chair because it is difficult to steer and generally manoeuvre, especially on cambered surfaces. Many known invalid vehicles have been mounted on a combination of castered and a few fixed-axle wheels, the latter giving some steering control without any serious increase of turning circle. One such vehicle has four wheels, mounted at the four corners of a square, and the normal direction of travel of the vehicle lies along a diagonal of that square. The front wheel is a sprung castered wheel, the back is unsprung castered, and the two remaining wheels are driven and are mounted on fixed, aligned axles; steering is effected by differential driving of the two fixed-axle wheels. The spring mounting of the front caster gives the vehicle some obstacle-mounting ability, but this ends when the resilience in the spring is taken up. Another disadvantage of such a vehicle is that the distribution of weight is concentrated heavily upon the main driving wheels; this leads to high power consumption whenever either of those wheels surmounts an obstacle.

The invention is defined by the claims at the end of this specification and will now be described, by way of example, with reference to the accompanying drawings in which:

FIGS. 2, 3 and 4 are similar views of the same suspension, taken in sequence as the vehicle negotiates an obstacle, other parts of the vehicle being shown in outline in FIG. 3;

FIG. 5 is a similar view of a modified suspension;

FIG. 6 is a diagrammatic underneath plan view of the suspension of FIGS. 1 to 4.

Figure 1:
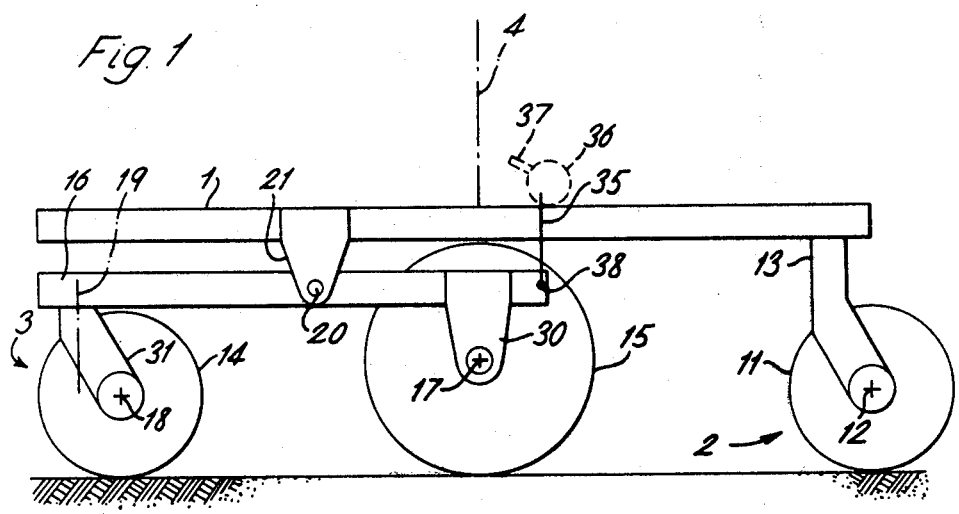
FIG. 1 is a diagrammatic side elevation of the suspension system of a vehicle on level ground.

The suspension of FIGS. 1 to 4 and FIG. 6 comprises a plate 1 carrying a wheel unit 2 and a bogie system comprising two bogie units 3. Between them, FIGS. 3 and 6 also show in outline a superstructure 5 including a seat 6, an electric power source 7, independent motors 8 for the two main wheels 15 and a control box 9 through which the occupant can steer the vehicle by imparting differential drive to the motors 8. Plate 1 is the base member of the essential structure of the body of the vehicle.

The vertical axis of turning of the vehicle (4, FIGS. 1 and 6) passes through the mid point of the plan projection of the axles 17 of both main wheels 15; the axes of the two wheels will in fact coincide provided the two bogie units 3 are equally tipped relative to plate 1. Axis 4 thus passes roughly through the plan centre of the vehicle; with differential steering of wheels 15 the radius of turn is thus no greater than the horizontal radius joining the axis to the furthest part of the vehicle (radius 41, FIG. 6). The fact that axis 4 passes through or closely by the centre of mass of the vehicle when loaded, also apparent from FIG. 6, leads furthermore to stable steering, since lack of such coincidence is a known cause of a tendency towards hunting in differentially-steered vehicles.

Arrow 10 indicates the direction of forward motion of the vehicle, although the vehicle geometry is also suitable for normal motion in the opposite direction provided seat 6 is turned round. It will thus be seen that wheel unit 2 comprises a single wheel 11 rotatable about a horizontal axis 12 and arranged to caster about vertical axis 13. Bogie units 3 are located at the front of the vehicle, one to each side; each unit comprises a front wheel 14, a larger rear wheel 15 and a rigid frame member 16. The pivot axle 17 of each wheel 15 is attached to its frame member 16 rigidly by bracket 30, while the axles 18 of wheels 14 are supported by cranked shafts 31 mounted to caster about axes 19. Members 16 pivot about a common transverse axis 20 defined by brackets 21 mounted in plate 1.

Figure 2:
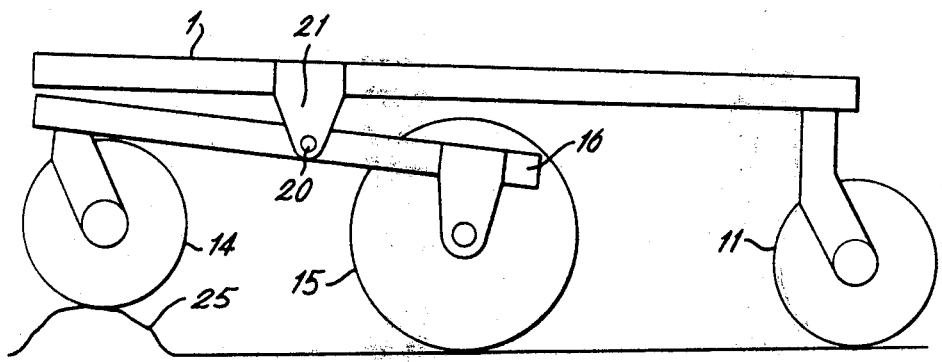
Figure 3:
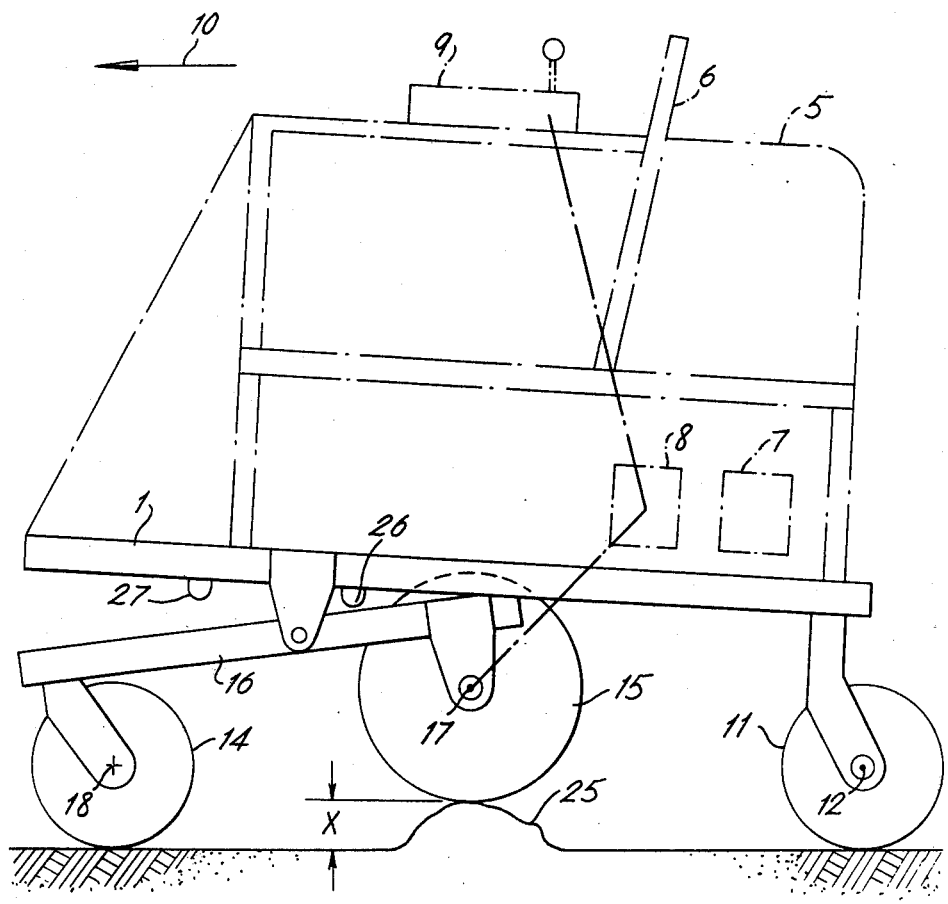

From a study of FIGS. 1 to 4, in which the vehicle is shown at successive stages during the negotiation of an obstacle 25 of a size within the range that the vehicle is designed to negotiate, it will be seen that all ground contacting wheels 11, 14 and 15 of the vehicle remain in contact with the ground at all times. The height of obstacle is X units and while FIG. 2 shows front bogie wheels 14 on top of the obstacle and thus raised a distance X above their normal level, and FIG. 3 shows the main rear driven bogie wheels 15 similarly raised, in each case the geometry of the bogie structure of units 3 causes the pivot axis 20 to be raised from its normal level by a distance less then X. Since the jolts suffered by the occupant of the vehicle are related more clearly to the vertical oscillations suffered by the plate 1, than to those of the wheels themselves, a better ride is achieved if such movements of the plate are made less than those of the wheels that it carries. Rear wheel 11 is of course of more normal kind, so when (in FIG. 4) this wheel lies on top of obstacle 25 the tail end of plate 1 is indeed raised a distance X above normal. However this is not as disturbing to the occupant as a similar rise of the front end of plate would be, because the occupant is less sensitive to movements of the trailing end of the vehicle than to those of the forward end, where the driving wheels are carried. It would of course be possible to lessen the effect of such obstacles upon the rear end of plate 1 still further by making wheel unit 11 a composite structure of bogie type, like units 3. Generally, single wheels where shown in the construction could be replaced by wheel units comprising pairs of wheels, wheels arranged in bogie-type constructions, etc.

The height of an obstacle that the vehicle can efficiently negotiate depends of course upon dimensions such as the length of members 16, and the clearance between axis 20 and the underside of the plate 1. The vehicle cannot reliably negotiate any obstacle so high that it causes either end of members 16, or any part of wheels 14 or 15, to foul plate 1. The apparent fouling of plate 1 by wheel 15 and the rearward end of member 16 shown in FIG. 3 is in fact avoided, for instance by providing recessed clearances in the underside of the plate.

Stops as shown diagrammatically at 26, 27 in FIG. 3 may be included to prevent the ends of members 16, and especially the rim of wheels 15, from fouling plate 1 should the vehicle run against too great an obstacle.

In the modified apparatus of FIG. 5, the straight frame members 16 of former Figures are replaced by a cranked member 28 and the short bracket 21 by a much deeper bracket 29, and the depending bracket by which axles 17 are suspended from members 16 is replaced by overslung caps 32. By thus lowering the main pivotal connection between the bogie structure and the body of the vehicle, the vertical jolt suffered by the vehicle and its occupant when an obstacle is negotiated will be somewhat increased, but the forwards or backwards jolt will be decreased, and this will be reflected in some economy in the power that the vehicle will require to overcome the obstacle.

FIG. 1 shows in outline a mechanism comprising a tie member 35 and a cam or like operating device 36 with handle 37. The lower end of tie 35 is attached to the rear end of one of the frame members 16 at 38, and by turning handle 37 clockwise that end of the member 16 can be raised so that the main driving wheel 15 leaves the ground if the vehicle is on the level. Relative to the body of the vehicle, the bogie structure will now take up an angle similar to that shown in FIG. 3, where of course the reason for the tilt is different because the vehicle is negotiating obstacle 25. Each member 16 will have its own operating device 36, and when both devices are operated so that both main driving wheels 15 lie clear of the ground, the vehicle rests only on castered wheels 11 and 14 and an attendant can therefore push it sideways or execute other movements that would be difficult or impossible with the main wheels on the ground.

It will be seen that when the vehicle is running normally (i.e. with the bogie structure not raised by tie 35), all five wheels 11, 14 and 15 are on the ground at all times, provided the vehicle is not attempting to negotiate too big an obstacle. Since each of these wheels whether driven or not must bear some proportion of the weight of the vehicle and its occupant, this distribution naturally tends to keep down the proportion of the total weight that is borne by the main driving wheels 15, and which is heavily reflected in the power requirement of the vehicle. This is in strong contrast to the behaviour of the known suspension of two coaxial and fixed-axle driving wheels, one leading sprung caster and one trailing unsprung caster described earlier in this specification. On uneven ground, such a vehicle for much of the time rocks forwards and backwards continually about the axis of the two driving wheels, the front and back casters making only intermittent contact with the ground, thus causing effectively the whole of the weight of the vehicle to be borne by the two main driving wheels only.

In describing the suspension systems of FIGS. 1 to 6 it has been stated that drive is applied to the two main wheels 15. However such systems can also be used for unpowered vehicles that must always be pushed or pulled by an attendant, for instance hospital trolleys.

Figure 7:
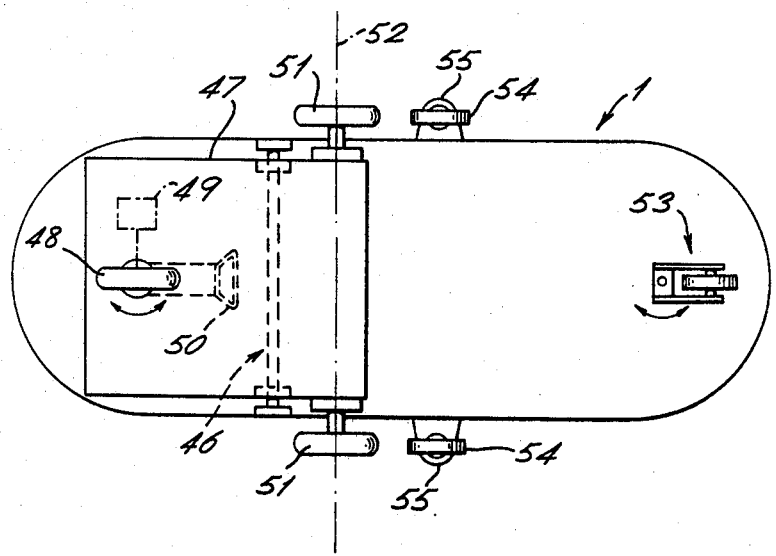
FIG. 7 is an underneath plan of a further construction.

In the alternative construction of vehicle suspension shown diagrammatically in FIG. 7 a single bogie unit 45, in contrast to the two units 3 of previous Figures, is pivotted to plate 1 about a transverse axis 46. The frame 47 of unit 45 carries a forward caster wheel 48 connected to a motor 49 and a steering arm 50; the occupant of the vehicle steers it by moving the arm 50 and has controls (not shown) to vary the speed of motor 49 and thus of the vehicle. Frame 47 also carries two free wheels 51 mounted on a fixed and common axis 52. A further caster wheel 53 is mounted at the rear end of plate 1. If wheels 51 are raised, by means such as the mechanism 35-38 of the previous Figures, only two caster wheels will remain on the ground and the vehicle will be unstable. To avoid this, extra retractable caster wheels 54 are provided in housings 55 mounted on plate 1. If wheels 49 are to be raised, wheels 54 will now first be lowered to replace them on the ground.

I claim:

1. A peripatetic vehicle comprising:
   a vehicle body structure;
   a suspension including a bogie system;
   means for pivotally connecting said bogie system and said vehicle body structure one to the other for relative movement about a transverse axis;
   means mounted on said bogie system defining a fixed transverse axle;
   two main wheel units mounted on said axle means and disposed at least substantially transversely opposite to each other with one unit adjacent each side of the vehicle;
   at least one other wheel unit carried by said bogie system, said one other wheel unit being a caster, and
   at least one further wheel unit carried by said vehicle body structure, said at least one further wheel unit being a caster.

2. A peripatetic vehicle according to claim 1 comprising further wheel units connected to said vehicle body structure, said further wheel units comprising casters.

3. A peripatetic vehicle according to claim 1 including drive means connected to said two main wheel units, said drive means being adapted to drive said two main wheel units at different speeds and thus to steer said vehicle.

4. A peripatetic vehicle according to claim 3 in which said drive means comprises two separate drive motors, one connected to each of said two main wheel units.

5. A peripatetic vehicle according to claim 1 in which said bogie system comprises a single bogie unit carrying said two main wheel units mounted coaxially, and at least one caster.

6. A peripatetic vehicle according to claim 1 in which:
   said bogie system comprises two bogie units;
   said transverse axis comprising a common transverse axle about which both of said two bogie units are pivoted to said vehicle body structure,
   means carried by each said bogie unit for supporting one of said two main wheel units, at least a pair of other wheel units carried by said bogie system, each of the latter wheel units being a caster, and means carried by each said bogie unit for supporting one of said casters.

7. A peripatetic vehicle according to claim 1 in which a notional line separating said two main wheels substantially intersects a notional vertical axis passing through the centre of mass of said vehicle when loaded.

8. A peripatetic vehicle according to claim 1 including means for raising said two main wheel units off the ground and to leave said vehicle supported by casters alone.

9. A peripatetic vehicle according to claim 8 including retractable caster wheels mounted on said vehicle body structure, for lowering to safeguard the stability of said vehicle when said two main wheels are raised.

10. A peripatetic vehicle according to claim 2 including means attached to one of said casters for steering the vehicle.

11. A peripatetic vehicle according to claim 2 including drive means connected to one of said casters.

* * * * *